US008627191B2

(12) United States Patent
Kary (10) Patent No.: US 8,627,191 B2
(45) Date of Patent: Jan. 7, 2014

(54) PRODUCING AN EDITED VISUAL INFORMATION SEQUENCE

(75) Inventor: Michael Loran Kary, Woodside, CA (US)

(73) Assignee: Apple Inc., Cupertino, CA (US)

( * ) Notice: Subject to any disclaimer, the term of this patent is extended or adjusted under 35 U.S.C. 154(b) by 1607 days.

(21) Appl. No.: 11/647,868

(22) Filed: Dec. 29, 2006

(65) Prior Publication Data

US 2008/0162538 A1    Jul. 3, 2008

(51) Int. Cl.
*G06F 7/00*    (2006.01)

(52) U.S. Cl.
USPC .......................................... 715/203; 707/102

(58) Field of Classification Search
USPC ........................................................ 715/203
See application file for complete search history.

(56) References Cited

U.S. PATENT DOCUMENTS

| 7,424,701 | B2 * | 9/2008 | Kendall et al. | 717/105 |
|---|---|---|---|---|
| 7,660,416 | B1 * | 2/2010 | Kline | 380/216 |
| 2002/0175917 | A1 * | 11/2002 | Chakravarty et al. | 345/473 |
| 2003/0220838 | A1 * | 11/2003 | Ishii et al. | 705/14 |
| 2004/0057696 | A1 * | 3/2004 | Peters et al. | 386/52 |
| 2005/0055636 | A1 * | 3/2005 | Graves | 715/526 |
| 2005/0188319 | A1 * | 8/2005 | Shinkai | 715/751 |
| 2007/0118801 | A1 * | 5/2007 | Harshbarger et al. | 715/730 |
| 2007/0239839 | A1 * | 10/2007 | Buday et al. | 709/208 |
| 2007/0277220 | A1 * | 11/2007 | Shikuma et al. | 725/139 |

OTHER PUBLICATIONS

Marshall, Dave, Open Media Framework Interchange (OMFI) Format:, http://www.cs.cf.ac.uk/Dave/Multimedia/node296.html, p. 1; Oct. 4, 2001.
Ferster, Bill "It's a Mob Mentality Out There: OMF Gains Followers", AV Video Magazine, pp. 1-3, http://www.stagetools.com/bill/Omf.htm, Jun. 1997.
Apple Computer, "Final Cut Pro", Wikipedia, http://wikipedia.org/wiki/Final_Cut_Pro, pp. 1-7, Feb. 22, 2007.
Apple Computer, "Cinema Tools", Wikipedia, http://en.wikipedia.org/wiki/Cinema_Tools, pp. 1-2, Sep. 26, 2006.

* cited by examiner

*Primary Examiner* — Laurie Ries
*Assistant Examiner* — Zaida I Marrero
(74) *Attorney, Agent, or Firm* — Kenyon & Kenyon, LLP (57) ABSTRACT

A second sequence of visual information is produced, based on a first sequence of visual information. An XML document is generated, which identifies edits to be made to the first sequence of visual information for producing the second sequence of visual information. The XML document includes an element that corresponds to a cut list. The cut list element includes multiple item elements, which are subordinate to the cut list element within the XML document. The multiple item elements include at least one item element that represents an effect; at least one that represents a cut and/or at least one that represents a gap. The XML document is used to determine how to edit the first sequence of visual information, to produce the second sequence of visual information.

25 Claims, 5 Drawing Sheets

100

Generate XML Document that Identifies Edits to be made to a 1st Visual Information Sequence, to Produce a 2nd Sequence of Visual Information 101

Use the XML Document to Determine how to Edit the 1st Sequence of Visual Information to Produce the 2nd Sequence of Visual Information 102

PRODUCING AN EDITED VISUAL INFORMATION SEQUENCE

The present invention relates generally to visual information, and more specifically, to producing an edited visual information sequence.

BACKGROUND

Modern visual media include video and film formats. Editing film and video typically involves off-line and on-line processes. The highest quality representations of visual images include, for video media, original camera tape and, for film media, camera original film negative. Editing is typically not performed with these highest quality representations, which are preserved for production activities that follow editing.

Film editing with original negatives is avoided in order to preserve inviolate as much of the highest quality reproduction as possible. For video editing, the expense of procuring and operating the high end recording and playback equipment needed to function with the highest quality videotapes and digital files deters its use in editing. Thus, copies of the source material that are typically of somewhat lower quality than the source media are typically used for editing.

Editing decisions are made with the editing copies. For instance, with film, editing is performed with work prints, which are copies of the source negatives. This allows editing functions with equipment that is relatively inexpensive to procure and operate. Upon completion of editing, when all the editing decisions have been made using the copies, the original high quality source media are conformed to match the results of the editing process. In film editing, upon editing the work prints, a negative cutter matches the camera original negative with the edited reels of work print. Video editing is typically performed off-line to produce an edit decision list (EDL).

An EDL is typically exported from an off-line system and imported by an on-line system, which conforms the original videotape to the edit decisions listed in the EDL. The EDL technique was developed long before the existence of digital non-linear editing systems. Although very well established in fields related to video editing and production, EDLs are quite simple and somewhat narrowly focused in the information provided therein. Efforts have thus been made to replace EDLs with techniques capable of transferring from the off-line system to the on-line system more of the information that the more sophisticated digital non-linear editing (DNLE) systems now make available.

One well known effort is the Open Media Framework (OMF), which is described in the OMF™ Interchange Specification available from Avid Technology, Inc., a corporation in Tewksbury, MA. This specification states that the OMF interchange format provides a standard for the interchanging of digital media data among heterogeneous platforms. Another effort is the Advanced Authoring Format (AAF), which is described at the website (www.aafassociation.org). More particularly, as described therein at: (www.aafassociation.org/html/techinfo/index.html), the AAF is a multi-media file format, which allows the exchange of digital media and meta-data across platforms and between systems and applications. However, export products of the OMF and AAF formats tend to be somewhat complex and not readily human readable.

Further, editing applications have developed, such as Final Cut Pro™ and Cinema Tools,™ which are commercially available from Apple Computers, Inc., a corporation in Sunnyvale, Calif. Final Cut Pro™ (FCP) and other such editing applications allow the transfer of editing data and meta-data from an off-line editing system to an on-line system or another application. FCP exports information about an edited sequence and the source material of that sequence, including meta-data. FCP exports this information in an Extensible Markup Language (XML) format.

Digital systems are also used with film based editing. The information captured in the film based medium is typically first transferred to a video medium, which is then digitized into the DNLE system. The DNLE system then performs the editing operations on the film based video, just as if the original source material was videotape. However, with this technique it becomes necessary to export a film cut list that contains information relating to the editing decisions, instead of an EDL. The film cut list contains information about film edge numbers, which is needed by the negative cutter to conform the original camera negative to the editing decisions.

Where applications such as FCP are used for editing video based source material, the application exports a video EDL, which identifies (e.g., names) a video by reel. The video EDL includes time code information for use by the on-line system. Where these applications edit film based source material, the applications export a film cut list, which contains film edge numbers for conforming the original camera negative. Conceptually therefore, a video EDL and a film cut list have essentially analogous purposes and contrast with each other in their actual content: the EDL having information specifically relevant for video media and the film cut list having information specifically relevant for film based media.

Newer techniques, such as "digital intermediate," for finishing film do not involve cutting and splicing the original camera negative to conform the off-line edited sequence. Instead, the negative is scanned a first time at a relatively low or intermediate resolution, which is used for the off-line editing. Upon reaching the editing decisions, the original camera negative is scanned a second time at high resolution. This second scan, sometimes called a "2K" scan, is typically used for performing color correction and implementing high resolution effects. A digital printer then outputs the result to film, which can be used for theatrical release.

Some high end post-production facilities perform film finishing using these digital intermediate processes. Digital intermediate facilities typically use their own internal software for importing lists from the off-line editing systems and transforming that information into their own, essentially internal formats. Interestingly, the lists that these facilities rely on for the most part do not readily incorporate any of the alternatives developed to the EDL. Thus, OMF or AAF are not generally applied, nor are applications such as FCP widely used. Instead and despite their limitations, EDL lists are widely still used.

It would appear that the reasons for the continued, modern use of EDLs for transferring editing data from off-line to on-line systems include its simplicity. Other reasons include the fact that EDLs are well known, popular and established in the field, and that they are time tested, reliable and widely supported. While newer formats such as OMF, AAF and FCP and similar formats make more information exportable than EDLs, complexity associated therewith may be deterring their widespread acceptance. Further, the newer formats are not yet well understood and little effort has been made to develop software to interface with them. Further, with the digital intermediate process, video reel and time code information from the EDL do not necessarily correlate with film edge numbers needed by the negative cutter. Where they are correlated (such as some efforts by Avid Technology, Inc.), exported information, like EDLs, is in plain text. However, plain text has limitations in transferring data from one computer platform to another. Where other formats are used however, they are less human readable than plain text.

Based on the foregoing, it would be useful to simplify the export of editing information from an off-line system.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF EXAMPLE EMBODIMENTS

Example embodiments of producing an edited visual information sequence are described herein. In the following description, for the purposes of explanation, numerous specific details are set forth in order to provide a thorough understanding of the present invention. It will be apparent, however, that the present invention may be practiced without these specific details. In other instances, well-known structures and devices are referred to without exhaustive treatment, in order to avoid unnecessarily obscuring the present invention.

Overview

Embodiments relate to producing an edited visual information sequence. In an embodiment, an XML document is generated. The XML document identifies edits to be made to the first sequence of visual information (e.g., unedited film or video), to produce the second sequence of visual information (e.g., edited film or video). The XML document includes an element that corresponds to a cut list. The cut list element includes multiple item elements, which are subordinate to the cut list element within the XML document.

The multiple item elements include at least one item element that represents an effect, at least one that represents a cut and/or at least one that represents a gap. The XML document is used to determine how to edit the first sequence of visual information, to produce the second sequence of visual information.

Thus, embodiments described herein allow the exportation of editing information from an off-line system in a format that is readily both human readable and machine readable.

Example Process

Figure 1:
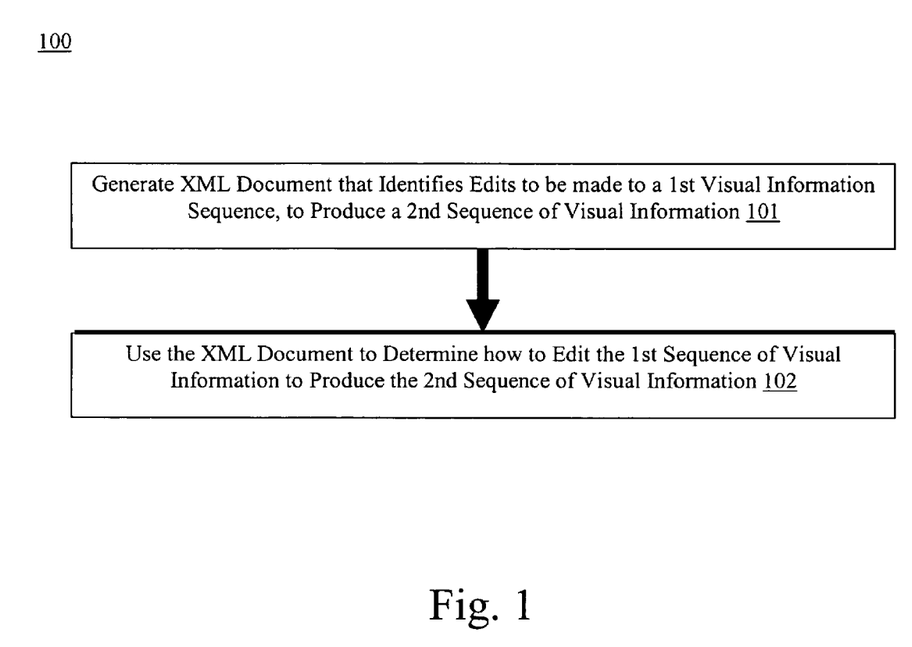
FIG. 1 depicts an example process, according to an embodiment of the present invention.

FIG. 1 depicts an example process 100, according to an embodiment of the present invention. To produce a second sequence of visual information based on a first sequence of visual information, an XML document is generated 101, which identifies edits to be made to the first sequence of visual information.

The XML document includes a cut list element that corresponds to a cut list. A cut list is a list of editing decisions, such as an EDL, which can conform the first sequence of visual information to editing decisions for producing the second sequence of visual information. The cut list element includes multiple item elements, which are subordinate to the cut list element within the XML document.

The item elements include one or more elements that are representative of an effect (e.g., a visual effect such as a fade-in, fade-out, optical, etc.), a cut (e.g., of visual information from the first sequence of visual information) and/or a gap (e.g., between portions of visual information in the first sequence of visual information).

The XML document is used 102 to determine how to edit the first sequence of visual information, to produce the second sequence of visual information. For instance, the editing decisions described, e.g., in both machine readable and human readable form, are used to edit the first sequence of visual information, in order to generate the second, e.g., edited sequence of visual information.

Example XML Document

Figure 2:
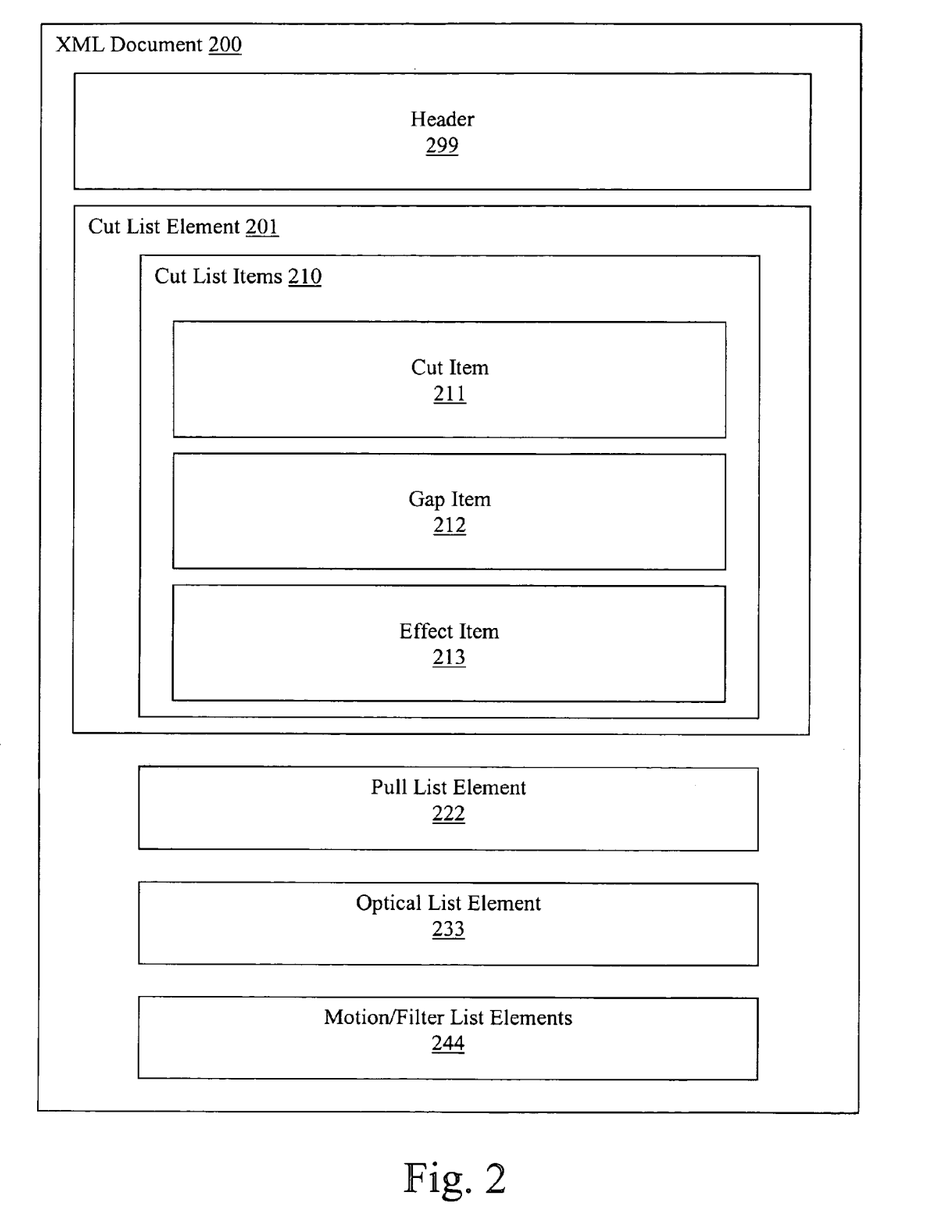
FIG. 2 depicts an example XML document, according to an embodiment of the present invention.

FIG. 2 depicts an example XML document 200, according to an embodiment of the present invention. An sample of an XML document, represented with example XML document 200, is appended hereto in Appendix 'A' to the instant application and is incorporated herein. XML document 200 is generated to identify edits to be made to the first sequence of visual information, such as a film based source negative or a source videotape. Features of the sample XML document in Appendix 'A' that are depicted with elements shown in FIG. 2 are shown in the Tables, below. XML document 200 has a header 299 that identifies the source, title, sequence, time rates, background and related information about the visual sequences to which it pertains. The sample XML shown below in Table 1 corresponds to header 299.

TABLE 1

```
<?xml version="1.0" encoding="UTF-8"?>
<ctlists version="0.1">
    <title>Sequence 1</title>
    <projectname>Sequence 1</projectname>
    <cinematoolsversion>3.1.2</cinematoolsversion>
    <date>Thu, Oct 12, 2006</date>
    <time>10:42:23 AM</time>
    <database>Gladiator CT db</database>
    <filmstandard>35mm4p</filmstandard>
    <runningfootagestart>0000+00</runningfootagestart>
    <runningcountstart>000000</runningcountstart>
    <runningtimestart>01:00:00:00</runningtimestart>
    <runningtimerate>24</runningtimerate>
    <originaltimebase>24</originaltimebase>
    <startwithleader>false</startwithleader>
    <includecutlist>true</includecutlist>
    <includedupelist>true</includedupelist>
    <includeopticallist>true</includeopticallist>
    <includepulllist>true</includepulllist>
    <includescenelist>true</includescenelist>
    <includemissinglist>true</includemissinglist>
    <transitions>Standard transitions are cuts</transitions>
    <duplicates>Warn of duplicates</duplicates>
    <transitionhandles>0</transitionhandles>
    <cuthandles>one-half frame</cuthandles>
```

XML document 200 has a cut list element 201 that corresponds to an editing cut list with a list of editing decisions. The editing decisions, like an EDL, specify how an original source of the first sequence of visual information is to be conformed to editing decisions to produce a second sequence of visual information. Cut list element 201 thus includes multiple item elements 210, which are subordinate to the cut list element 201 within XML document 200.

A cut item element 211 represents a cut, e.g., visual information that is to be cut (removed) from the first sequence of visual information to produce a final product (e.g., the second sequence of visual information). The sample XML shown in Table 2 below corresponds to cut item element 211 and shows the running film/video footage start, length and end, the running frame count start, length and end, and the running time start, length, end and rate, which correspond to the cut.

TABLE 2

```
<cut>
    <eventnumber>0001</eventnumber>
    <runningfootagestart>0000+00</runningfootagestart>
    <runningfootagelength>0015+08</runningfootagelength>
    <runningfootageend>0015+07</runningfootageend>
    <runningcountstart>000000</runningcountstart>
    <runningcountlength>000248</runningcountlength>
    <runningcountend>000247</runningcountend>
    <runningtimestart>01:00:00:00</runningtimestart>
    <runningtimelength>00:00:10:08</runningtimelength>
    <runningtimeend>01:00:10:07</runningtimeend>
    <runningtimerate>24</runningtimerate>
    <keycodereversed>false</keycodereversed>
    <keyprefix>KK 23 1166</keyprefix>
    <keynumstart>8010+06</keynumstart>
    <keynumend>8025+13</keynumend>
    <inkprefix>054</inkprefix>
    <inknumstart>1040+15</inknumstart>
    <inknumend>1056+06</inknumend>
    <sourcetimestart>08:00:27:07</sourcetimestart>
    <sourcetimeend>08:00:37:14</sourcetimeend>
    <sourcetimerate>24</sourcetimerate>
    <filmstandard>35mm4p</filmstandard>
    <note>Here is a note to go with A54-2(A)</note>
    <videoreel>068</videoreel>
    <cameraroll>054</cameraroll>
    <labroll/>
    <dailyroll/>
    <scene>A54</scene>
    <take>2(A)</take>
    <clipname>A54-2(A)</clipname>
    <hasduplicateusage>false</hasduplicateusage>
    <hassuper>false</hassuper>
</cut>
```

A gap item 212 represents a gap, e.g., a space to be removed between portions of the first sequence of visual information that are to be retained in the second sequence. The sample XML shown in Table 3 below corresponds to gap item element 212 and shows the running film/video footage start, length and end, the running frame count start, length and end, and the running time start, length, end and rate, which correspond to the gap.

TABLE 3

```
<gap>
    <eventnumber>0004</eventnumber>
    <runningfootagestart>0076+00</runningfootagestart>
    <runningfootagelength>0015+06</runningfootagelength>
    <runningfootageend>0091+05</runningfootageend>
    <runningcountstart>001216</runningcountstart>
    <runningcountlength>000246</runningcountlength>
    <runningcountend>001461</runningcountend>
    <runningtimestart>01:00:50:16</runningtimestart>
    <runningtimelength>00:00:10:06</runningtimelength>
    <runningtimeend>01:01:00:21</runningtimeend>
    <runningtimerate>24</runningtimerate>
</gap>
```

An effect item 213 represents a visual effect to be used with the first sequence of visual information in producing the second sequence of visual information.

Various effects may be used in producing the second sequence of visual information. Some of these effects include the following. A fade in describes visual information relating to an incoming scene. A fade out describes visual information relating to an outgoing scene. A transition describes visual information relating to an outgoing scene, as well as to an incoming scene. A motion describes movement to be shown within a scene. An optical describes visual information relating to a scene that includes an optical effect described in a separate table, list or the like, and described perhaps with its own syntax. The sample XML shown in Table 4 corresponds to effect items 213. The effect begins with a fade-in and includes a cross-dissolve, for which the running film/video footage start, length and end, the running frame count start, length and end, and the running time start, length, end and rate, which correspond thereto are given, as well as data relating to the incoming visual information of the cross-dissolve effect.

TABLE 4

```
<fadein>
    <effectname>Cross Dissolve</effectname>
    <runningfootagestart>0000+00</runningfootagestart>
    <runningfootagelength>0001+08</runningfootagelength>
    <runningfootageend>0001+07</runningfootageend>
    <runningcountstart>000000</runningcountstart>
    <runningcountlength>000024</runningcountlength>
    <runningcountend>000023</runningcountend>
    <runningtimestart>01:00:00:00</runningtimestart>
    <runningtimelength>00:00:01:00</runningtimelength>
    <runningtimeend>01:00:00:23</runningtimeend>
    <runningtimerate>24</runningtimerate>
    <incoming>
        <eventnumber>0001</eventnumber>
        <keycodereversed>false</keycodereversed>
        <keyprefix>KK 23 1166</keyprefix>
        <keynumstart>8010+06</keynumstart>
        <keynumend>8011+13</keynumend>
        <inkprefix>054</inkprefix>
        <inknumstart>1040+15</inknumstart>
        <inknumend>1042+06</inknumend>
        <sourcetimestart>08:00:27:07</sourcetimestart>
        <sourcetimeend>08:00:28:06</sourcetimeend>
        <sourcetimerate>24</sourcetimerate>
        <filmstandard>35mm4p</filmstandard>
        <note>Here is a note to go with A54-2(A)</note>
        <videoreel>068</videoreel>
        <cameraroll>054</cameraroll>
        <labroll/>
        <dailyroll/>
        <scene>A54</scene>
        <take>2(A)</take>
        <clipname>A54-2(A)</clipname>
    </incoming>
</fadein>
```

XML document 200 may also include a pull list 222, which relates information related to film reel and/or videotape identifiers to allow original source material to be conformed to the information in the cut list element 201. XML document 200 may also include an optical list 233, which relates information related to film reel and/or videotape identifiers to allow original source material to be conformed to the information in the cut list element 201. One or more separate motion effects and/or filter effects elements 244 may also be included in XML document 200. The sample XML shown in Table 5 corresponds to portions of a multiple segment pull list element 222 and shows the running film/video footage start, length and end, the running frame count start, length and end, and the running time start, length, end and rate, which correspond to the pull list items shown.

TABLE 5

```
<pulllist>
    <items>
        <pull>
            <eventnumber>0002</eventnumber>
            <runningfootagestart>0014+12</runningfootagestart>
            <runningfootagelength>0017+12</runningfootagelength>
            <runningfootageend>0032+07</runningfootageend>
            <runningcountstart>000236</runningcountstart>
            <runningcountlength>000284</runningcountlength>
            <runningcountend>000519</runningcountend>
            <runningtimestart>01:00:09:20</runningtimestart>
            <runningtimelength>00:00:11:20</runningtimelength>
            <runningtimeend>01:00:21:15</runningtimeend>
            <runningtimerate>24</runningtimerate>
            <keycodereversed>false</keycodereversed>
            <keyprefix>KK 05 1354</keyprefix>
            <keynumstart>4359+04</keynumstart>
            <keynumend>4376+15</keynumend>
            <inkprefix>054</inkprefix>
            <inknumstart>1366+10</inknumstart>
            <inknumend>1384+05</inknumend>
            <sourcetimestart>08:04:04:10</sourcetimestart>
            <sourcetimeend>08:04:16:05</sourcetimeend>
            <sourcetimerate>24</sourcetimerate>
            <filmstandard>35mm4p</filmstandard>
            <note/>
            <videoreel>068</videoreel>
            <cameraroll>054</cameraroll>
            <labroll/>
            <dailyroll/>
            <scene>A54A</scene>
            <take>1(B)</take>
            <clipname>A54A-1(B)</clipname>
        </pull>
```

The sample XML shown in Table 6 below corresponds to an example of optical list 233 and shows the running film/video footage start, length and end, the running frame count start, length and end, and the running time start, length, end and rate, which correspond to the respective items shown. Filter effects element 244 and various other features, functions, effects and items may similarly be shown.

TABLE 6

```
<optical>
    <eventnumber>0003</eventnumber>
    <opticalnumber>0001</opticalnumber>
    <runningfootagestart>0032+08</runningfootagestart>
    <runningfootagelength>0043+08</runningfootagelength>
    <runningfootageend>0075+15</runningfootageend>
    <runningcountstart>000520</runningcountstart>
    <runningcountlength>000696</runningcountlength>
    <runningcountend>001215</runningcountend>
    <runningtimestart>01:00:21:16</runningtimestart>
    <runningtimelength>00:00:29:00</runningtimelength>
    <runningtimeend>01:00:50:15</runningtimeend>
    <runningtimerate>24</runningtimerate>
</optical>
```

Example Production Flow

Figure 3:
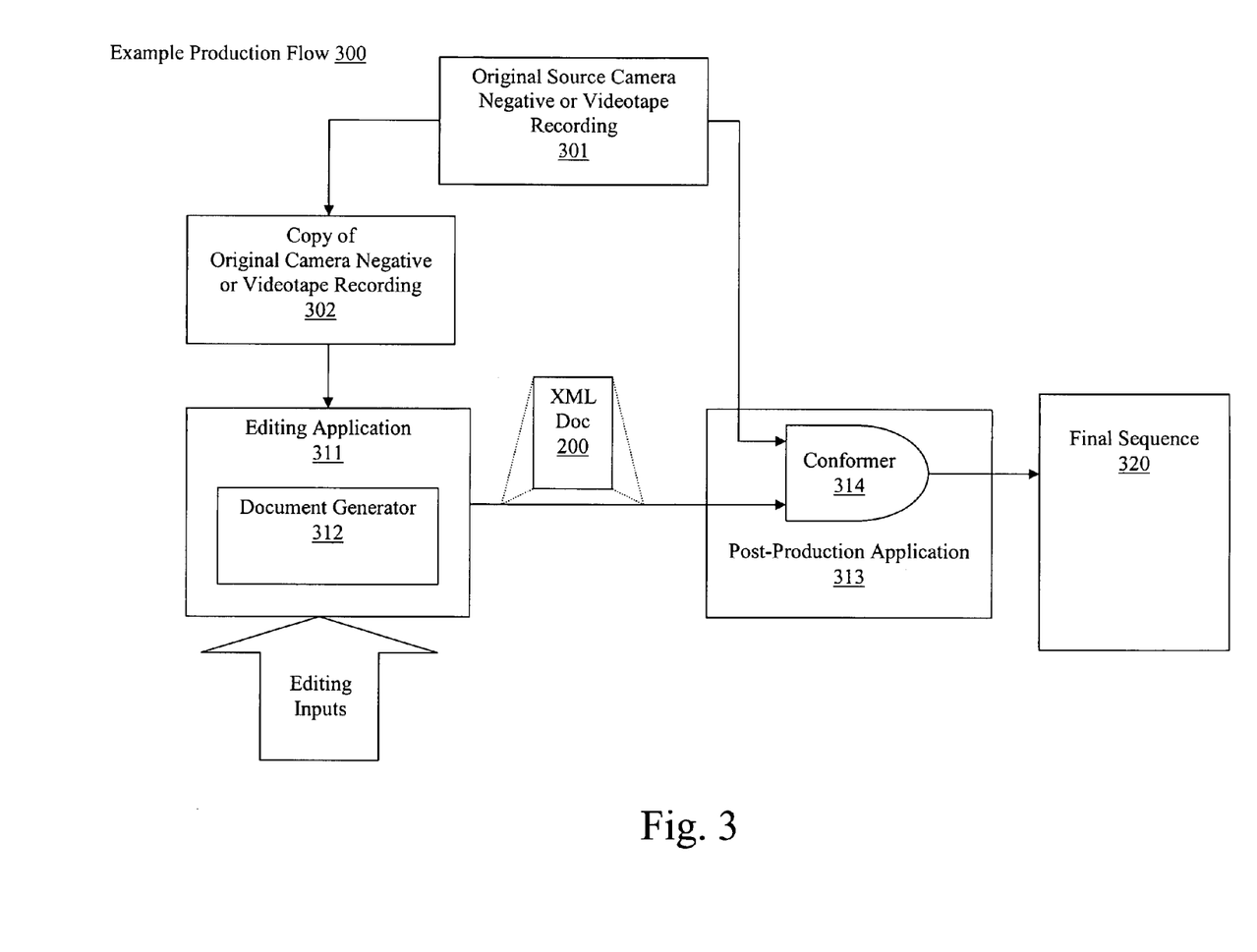
FIG. 3 depicts an example production flow, according to an embodiment of the present invention.

FIG. 3 depicts an example production flow 300, according to an embodiment of the present invention. An original source stream 301 of visual information is made with a camera (e.g., an original negative) or videotape recorder (e.g., for high quality video recordings). A copy 302 is prepared from the source stream 301 and supplied to an editing application 311, which accepts editing inputs. In response to the editing inputs, a document generating function 312 of editing application 311 produces an XML document such as XML document 200.

The XML document is exported to a post-production application 313. A conforming function 314 of application 313 conforms the original source stream 301 of visual information to editing decisions specified with the XML document. Upon conforming the original source stream to the editing decisions, a final sequence 320 (e.g., a second sequence) of visual information is made available.

Example Hardware Implementation

Figure 4:
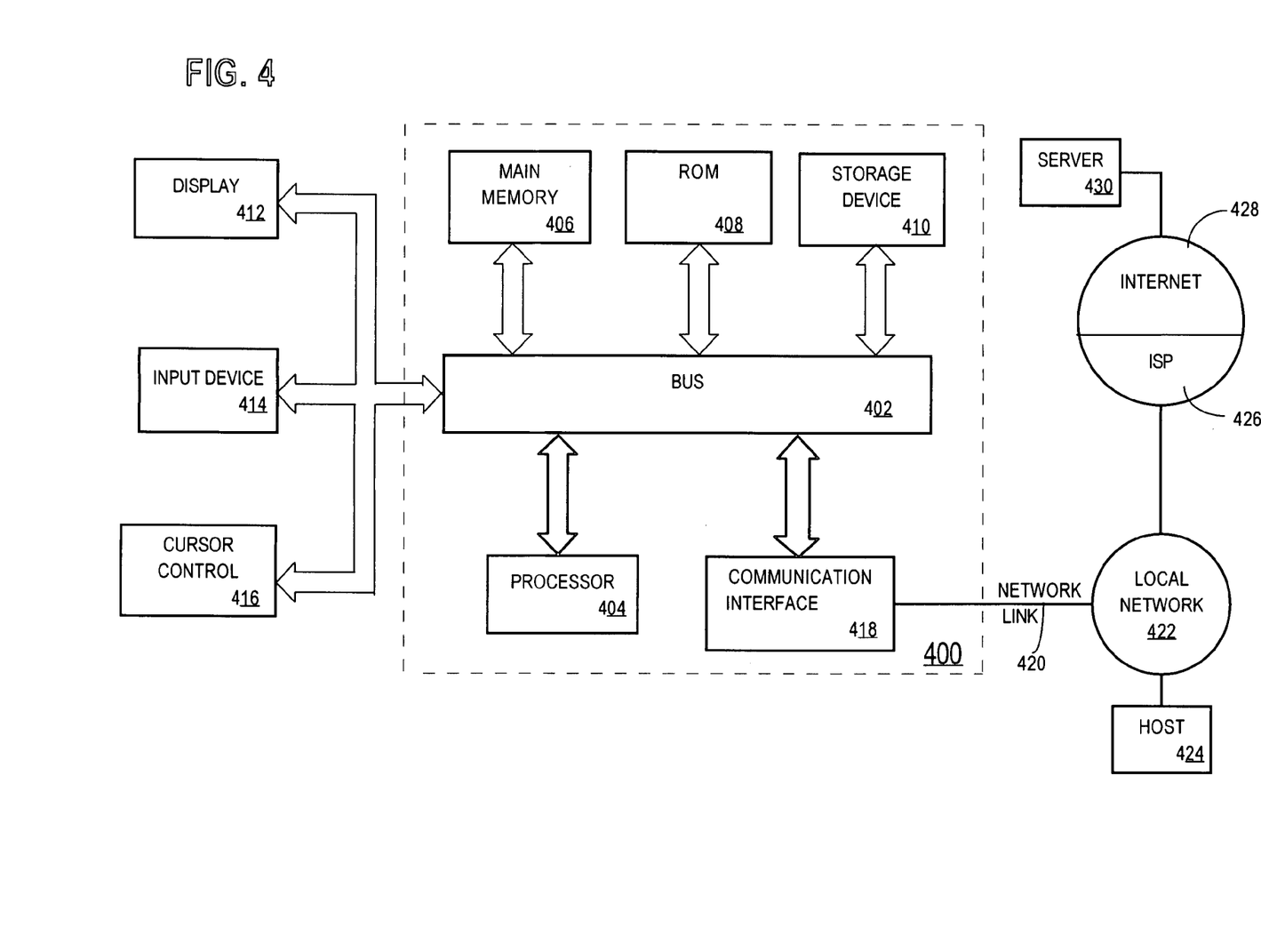
FIG. 4 depicts an example computer platform upon which an embodiment of the present invention may be practiced.

FIG. 4 depicts an example computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a liquid crystal display (LCD), a cathode ray tube (CRT) or the like, for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Example embodiments of the invention relate to the use of computer system 400 for replicating changes, made to data blocks at a source database system, to replicas of the data blocks at the standby database system. According to one embodiment of the invention, replicating changes, made to data blocks at a source database system, to replicas of the data blocks at the standby database system is provided by one or more instances of computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. One or more processors in a multi-processing arrangement may also be employed to execute the sequences of instructions contained in main memory 406. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other legacy or other physical medium with patterns of holes and other computer-readable media, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector coupled to bus 402 can receive the data carried in the infrared signal and place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card a cable or digital subscriber line (DSL) modem or another modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the worldwide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. In accordance with the invention, one such downloaded application provides for replicating changes, made to data blocks at a source database system, to replicas of the data blocks at the standby database system, as described herein.

The received code may be executed by processor 404 as it is received, and/or stored in storage device 410, or other non-volatile storage for later execution. In this manner, computer system 400 may obtain application code in the form of a carrier wave.

Computer system 400 can be configured to perform the example processes described herein. In an embodiment, multiple computer systems 400 are combined to configure a system for generating and parsing XML documents to perform an example process described herein.

Example Process

Figure 5:
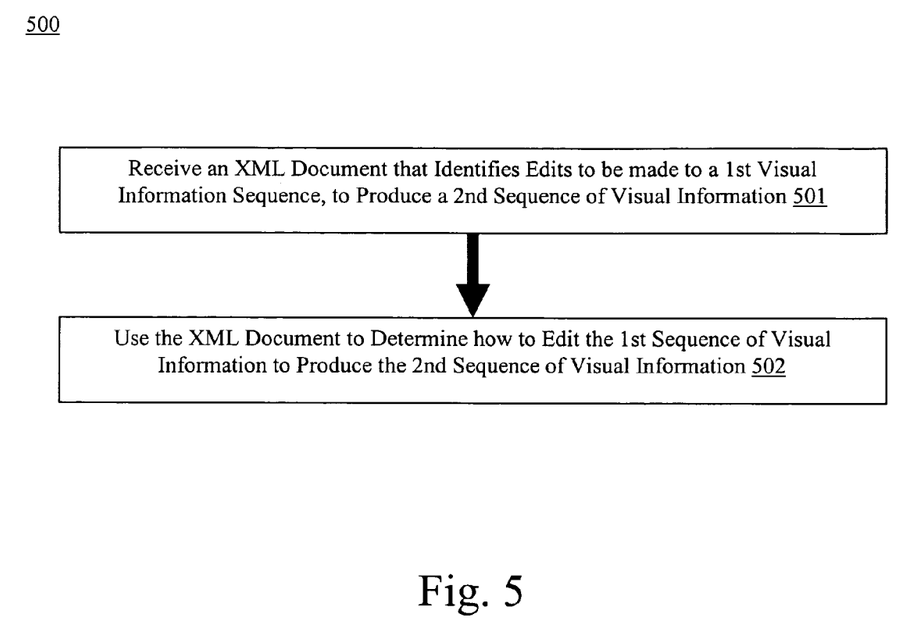
FIG. 5 depicts an example process, according to an embodiment of the present invention.

FIG. 5 depicts an example process 500, according to an embodiment of the present invention. To produce a second sequence of visual information based on a first sequence of visual information, an XML document is received 101, which was generated to identify edits to be made to the first sequence of visual information. The XML document is used 102 to determine how to edit the first sequence of visual information, to produce the second sequence of visual information.

Equivalents, Extensions, Alternatives &
Miscellaneous

Thus, example embodiments relating to producing an edited visual information sequence are described. In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method of producing a second sequence of visual information based on a first sequence of visual information, the method comprising:

receiving input specifying one or more editing decisions that identify one or more edits to be made to the first sequence of visual information to produce the second sequence of visual information;

generating a single Extensible Markup Language (XML) document that specifies how a source of the first sequence of visual information is to be conformed to the one or more editing decisions to produce the second sequence of visual information;

wherein at least one editing decision of the one or more editing decisions relates to either:

(a) visual information that is to be cut from the first sequence of visual information to produce a final product, (b) a space to be removed between portions of the first sequence of visual information that are to be retained in the second sequence of visual information, or (c) a visual effect to be used with the first sequence of visual information in producing the second sequence of visual information;

wherein the XML document comprises at least one element corresponding to the at least one editing decision;
wherein the at least one element contains information subordinate to the at least one element within the XML document;
wherein the subordinate information pertains to the at least one editing decision and includes running film footage information, running frame count information, and running time information pertaining to the at least one editing decision;
wherein the running film footage information comprises an element, subordinate in the XML document to the at least one element, that specifies a running film footage count pertaining to the at least one editing decision;
wherein the running frame count information comprises an element, subordinate in the XML document to the at least one element, that specifies a running frame count pertaining to the at least one editing decision but does not specify a running footage count pertaining to the at least one editing decision;
wherein the running time information comprises an element, subordinate in the XML document to the at least one element, that specifies a running time pertaining the at least one editing decision;
wherein the method is performed by one or more computing devices.

2. The method as recited in claim 1, wherein the at least one element corresponds to a particular cut; and wherein the at least one element that corresponds to the particular cut includes subordinate elements that indicate:
a running footage start for the particular cut;
a running footage length for the particular cut;
a running footage end for the particular cut;
a running count start for the particular cut;
a running count length for the particular cut;
a running count end for the particular cut;
a running time start for the particular cut;
a running time length for the particular cut; and
a running time end for the particular cut.

3. The method as recited in claim 1 wherein the at least one element corresponds to a particular gap; and wherein the at least one element that corresponds to the particular gap includes subordinate elements that indicate:
a running footage start for the particular gap;
a running footage length for the particular gap;
a running footage end for the particular gap;
a running count start for the particular gap;
a running count length for the particular gap;
a running count end for the particular gap;
a running time start for the particular gap;
a running time length for the particular gap; and
a running time end for the particular gap.

4. The method as recited in claim 1 wherein the at least one element corresponds to a particular effect; and wherein the at least one element that corresponds to the particular effect includes subordinate elements that indicate:
a running footage start for the particular effect;
a running footage length for the particular effect;
a running footage end for the particular effect;
a running count start for the particular effect;
a running count length for the particular effect;
a running count end for the particular effect;
a running time start for the particular effect;
a running time length for the particular effect; and
a running time end for the particular effect.

5. The method as recited in claim 4 wherein the particular effect comprises a visual transition effect.

6. The method as recited in claim 5 wherein the visual transition effect comprises one or more of a fade-in and a fade-out.

7. The method as recited in claim 6 wherein, upon said visual transition effect comprising a fade-in, a transitional content associated with the fade-in comprises an essentially gradual development of an incoming scene.

8. The method as recited in claim 6 wherein, upon said visual transition effect comprising a fade-out, a transitional content associated with the fade-out comprises an essentially gradual extinguishing of an outgoing scene.

9. The method as recited in claim 4 wherein the particular effect comprises an optical effect.

10. The method of claim 1,
wherein the XML document includes a cut list element that corresponds to a cut list, wherein the cut list element includes a plurality of item elements that are subordinate to the cut list element within the XML document;
wherein the plurality of item elements include one or more items from the set of an item element that represents an effect, an item element that represents a cut, and an item element that represents a gap.

11. The method of claim 1, further comprising:
using said XML document to determine how to edit the source of said first sequence of visual information to produce said second sequence of visual information.

12. A method for producing a second sequence of visual information based on a first sequence of visual information, the method comprising:
receiving a single Extensible Markup Language (XML) document that specifies how a source of the first sequence of visual information is to be conformed to one or more editing decisions to produce the second sequence of visual information;
wherein at least one editing decision of the one or more editing decisions relates to either:
(a) visual information that is to be cut from the first sequence of visual information to produce a final product,
(b) a space to be removed between portions of the first sequence of visual information that are to be retained in the second sequence of visual information, or
(c) a visual effect to be used with the first sequence of visual information in producing the second sequence of visual information;
wherein the XML document comprises at least one element corresponding to the at least one editing decision;
wherein the at least one element contains information subordinate to the at least one element within the XML document;
wherein the subordinate information pertains to the at least one editing decision and includes running film footage information, running frame count information, and running time information pertaining to the at least one editing decision;
wherein the running film footage information comprises an element, subordinate in the XML document to the at least one element, that specifies a running film footage count pertaining to the at least one editing decision;
wherein the running frame count information comprises an element, subordinate in the XML document to the at least one element, that specifies a running frame count pertaining to the at least one editing decision but does not specify a running footage count pertaining to the at least one editing decision;
wherein the running time information comprises an element, subordinate in the XML document to the at least one element, that specifies a running time pertaining to the at least one editing decision;

using said XML document to determine how to edit the source of said first sequence of visual information to produce said second sequence of visual information;

wherein the method is performed by one or more computing devices.

13. A system for producing a second sequence of visual information based on a first sequence of visual information, the system comprising:

a bus;

one or more processors coupled to said bus;

a storage coupled to said bus;

code stored with said storage, which when executed by said one or more processors causes said one or more processors to generate a single Extensible Markup Language (XML) document that specifies how a source of a first sequence of visual information is to be conformed to one or more editing decisions to produce a second sequence of visual information;

wherein at least one editing decision of the one or more editing decisions relates to either:
(a) visual information that is to be cut from the first sequence of visual information to produce a final product,
(b) a space to be removed between portions of the first sequence of visual information that are to be retained in the second sequence of visual information, or
(c) a visual effect to be used with the first sequence of visual information in producing the second sequence of visual information;

wherein the XML document comprises at least one element corresponding to the at least one editing decision;

wherein the at least one element contains information subordinate to the at least one element within the XML document;

wherein the subordinate information pertains to the at least one editing decision and includes running film footage information, running frame count information, and running time information pertaining to the at least one editing decision;

wherein the running film footage information comprises an element, subordinate in the XML document to the at least one element, that specifies a running film footage count pertaining to the at least one editing decision;

wherein the running frame count information comprises an element, subordinate in the XML document to the at least one element, that specifies a running frame count pertaining to the at least one editing decision but does not specify a running footage count pertaining to the at least one editing decision;

wherein the running time information comprises an element, subordinate in the XML document to the at least one element, that specifies a running time pertaining to the at least one editing decision.

14. A computer-readable non-transitory storage medium storing one or more sequences of instructions which, when executed by one or more processors, causes the one or more processors to perform the method recited in claim 1.

15. A computer-readable non-transitory storage medium storing one or more sequences of instructions which, when executed by one or more processors, causes the one or more processors to perform the method recited in claim 2.

16. A computer-readable non-transitory storage medium storing one or more sequences of instructions which, when executed by one or more processors, causes the one or more processors to perform the method recited in claim 3.

17. A computer-readable non-transitory storage medium storing one or more sequences of instructions which, when executed by one or more processors, causes the one or more processors to perform the method recited in claim 4.

18. A computer-readable non-transitory storage medium storing one or more sequences of instructions which, when executed by one or more processors, causes the one or more processors to perform the method recited in claim 5.

19. A computer-readable non-transitory storage medium storing one or more sequences of instructions which, when executed by one or more processors, causes the one or more processors to perform the method recited in claim 6.

20. A computer-readable non-transitory storage medium storing one or more sequences of instructions which, when executed by one or more processors, causes the one or more processors to perform the method recited in claim 7.

21. A computer-readable non-transitory storage medium storing one or more sequences of instructions which, when executed by one or more processors, causes the one or more processors to perform the method recited in claim 8.

22. A computer-readable non-transitory storage medium storing one or more sequences of instructions which, when executed by one or more processors, causes the one or more processors to perform the method recited in claim 9.

23. A computer-readable non-transitory storage medium storing one or more sequences of instructions which, when executed by one or more processors, causes the one or more processors to perform the method recited in claim 10.

24. A computer-readable non-transitory storage medium storing one or more sequences of instructions which, when executed by one or more processors, causes the one or more processors to perform the method recited in claim 11.

25. A computer-readable non-transitory storage medium storing one or more sequences of instructions which, when executed by one or more processors, causes the one or more processors to perform the method recited in claim 12.

* * * * *